UNITED STATES PATENT OFFICE 1,965,855

MANUFACTURE OF BENZANTHRONYL-SELENIUM COMPOUNDS

Melvin A. Perkins, Milwaukee, Wis., assignor to E. I. du Pont de Nemours & Company, Wilmington, Del., a corporation of Delaware No Drawing. Application March 18, 1933, Serial No. 661,583

16 Claims. (Cl. 260—61)

This invention relates to the manufacture of benzanthrone-selenium compounds. By the latter term I am referring to organic compounds containing both a benzanthrone nucleus and a selenium atom. More particularly, this invention deals with the manufacture of compounds of the general formula:

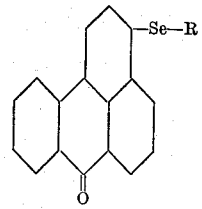

wherein R stands for a hydrogen atom, a metallic atom, or radical, a benzanthrone nucleus or a seleno-benzanthrone radical. These compounds are typified by benzanthrone-selenol, benzanthrone-sodium-selenolate, dibenzanthronyl-selenide, and dibenzanthronyl-diselenide. In its broadest aspect this invention is applicable also to the manufacture of substitution derivatives of these compounds, such as dichloro-, dibromo-, diamino or dimethoxy-dibenzanthronyl selenides. The compounds of the above general formula constitute valuable intermediates for dyestuffs.

It is an object of this invention to provide a practical and economical method for manufacturing compounds of the above general formula.

It is a further object of this invention to provide a process for the manufacture of the above compounds, which is controllable to produce mainly one or the other of the above individual compounds, or a mixture thereof.

It is a further object of this invention to provide a process for the manufacture of the above compounds which enables one to use relatively inexpensive low boiling solvents, at ordinary pressure, and without necessitating expensive solvent recovery procedures.

Other and further important objects and advantages of this invention will appear as the description proceeds.

According to my invention a Bzl-halogen-benzanthrone, such as Bzl-chloro-benzanthrone, Bzl-bromo-benzanthrone, or substitution derivatives of either, for instance, the nitro-, methoxy-, or halogen-derivative, is heated in a diluent with an alkali-metal selenide or polyselenide. The temperature required for reaction with a selenizing agent of this type is not so high as in the case where elemental selenium is used. I am therefore enabled to use as a suspending medium in my process, water, alcohol, or an aqueous alcoholic mixture, at their respective reflux temperatures. The effect of this in turn is, in the first instance, a saving in the cost of the suspending medium, and secondly, a simplification or complete elimination of the step of recovering the medium. Another advantage is that simpler plant equipment may be used, because of the employment of ordinary pressure. The hazard of fire is also considerably reduced, compared, for instance, to the kerosene or tetralene process required with elemental selenium.

I have further found that when a low boiling diluent is employed as above, with a consequent lower reaction temperature, the reaction becomes susceptible of control to produce either benzanthrone-sodium-selenolate or dibenzanthronyl-selenide or intermediate mixtures of the two. The use of an excess of alcohol and cutting short the reaction time are factors which favor the production of benzanthrone-sodium-selenolate. The use of an excess of alkali-metal selenide, and especially the use of an alkali-metal polyselenide, and continuing the heating for a long time, favor the production of dibenzanthronyl-selenide. Dibenzanthronyl-diselenide is produced by oxidation, or even simple aeration of benzanthrone-selenol or an alkali-metal salt thereof. It is in fact generally present in any mixture containing the selenolate, due to oxidation by contact with air during the course of the reaction.

The alkali-metal selenide or polyselenide required for the reaction may be prepared by various methods; for instance, the action of metallic sodium or potassium on selenium in a solvent or diluent such as alcohol; reaction between selenium and sodium hydroxide or potassium hydroxide in water or aqueous alcohol, in the presence of a reducing metal such as aluminum or magnesium; heating together phosphorus and selenium, and decomposing the resulting melt with aqueous alkali. In any of the above cases, the presence of an excess of selenium will result in the formation of a polyselenide.

Since the medium in which the alkali-metal selenide or polyselenide is formed is of the same nature as that used for manufacturing the benzanthrone-selenium compound, it is not necessary to isolate the alkali-metal selenide or polyselenide. Instead, the reaction mass in which the inorganic compound is formed may be used directly for the formation of the organic compound, with or without the further addition of alcohol or water, as the case may be. In fact, the alkali-metal selenide may be formed directly in the medium containing the benzanthrone halogen compound, whereby the formation of the selenizing agent and its immediate consumption in the production of the benzanthrone derivative are continuous and concurrent.

From the viewpoint of present demand, the dibenzanthronyl selenide is the more desirable component of the reaction mixture. It is therefore advantageous to conduct the reaction under conditions favoring the production of dibenzanthronyl selenide in high yield. This is best effected by using initially a quantity of selenium, sodium selenide or sodium polyselenide which contains at least one selenium atom per mole of halogen benzanthrone. In other words, it is advantageous to start with a 100% excess of the selenizing agent. It is also advisable to use not over 2.5 parts of alcohol per part of benzanthrone-halide, and to continue the reaction until a test sample of the solid reaction product when dissolved in sulfuric acid gives a distinct greenish blue coloration, indicating complete conversion into dibenzanthronyl-selenide.

Without limiting my invention to any particular procedure, the following examples, in which parts by weight are given, will serve to illustrate my preferred mode of operation.

*Example 1*

3.1 parts of red phosphorus and 60 parts of selenium are intimately mixed by grinding and the mixture heated in a closed vessel until molten. After cooling to room temperature, 130 parts of 30% sodium hydroxide solution are added and the mixture agitated rapidly with gentle warming until completely dissolved. To the sodium polyselenide solution thus obtained, 10 parts of Bzl-bromo-benzanthrone are added and the mixture is boiled with vigorous stirring. By allowing steam to escape, the temperature is made to rise to 132° C. over the course of two hours, and is then maintained one hour longer at 132° C. The mass is then diluted with 200 parts of water and filtered and the residue is extracted with 1000 parts of dilute sodium sulfide solution (4% $Na_2S$) in order to remove excess selenium. The solid is once more filtered off, washed free of alkali and dried. The product forms a yellowish brown powder and dissolves in concentrated sulfuric acid with a greenish blue color. By repeated crystallization from nitrobenzene, preferably with addition of filter-cel, pure Bzl,Bzl'-dibenzanthronyl selenide (M. P. 336–7° C.) is obtained.

*Example 2*

To a suspension of 1 part of Bzl-bromo-benzanthrone in 2.5 parts of denatured ethyl alcohol, 0.4 parts of freshly prepared sodium selenide are added, and the mixture is heated to reflux for three hours. At first the mixture turns into a bright blue solution, which slowly changes color to a greenish gray, and finally to a brownish yellow with gradual thickening of the mass. After three hours of refluxing, the mass is diluted with water and filtered, and the filter cake is washed with hot water until the washings are colorless. The residue is a yellow brown solid and gives a green-blue color in sulfuric acid. It consists of nearly pure Bzl,Bzl'-dibenzanthronyl selenide.

*Example 3*

To a suspension of 50 parts of Bzl-bromo-benzanthrone in 200 parts of denatured ethyl alcohol and 50 parts of water, 22.3 parts of freshly prepared sodium selenide (prepared from selenium and sodium in alcohol) are added. The mixture is heated to reflux. After about one-half hour a nearly complete violet solution is obtained and as refluxing continues a greenish yellow solid appears and increases in volume. After two hours of refluxing, the reaction is stopped, the mass filtered and the residue washed with hot water.

This residue gives a greenish blue color in sulfuric acid solution and corresponds in selenium content to Bzl,Bzl'-dibenzanthronyl selenide.

The filtrate deposits more solid, simply upon handling in the air. This solid is an orange colored product which dissolves in sulfuric acid with a dull, dark-blue color and which contains about 24% selenium, which nearly corresponds to the theoretical percentage of selenium in Bzl,Bzl'-dibenzanthronyl-diselenide, (25.7%). It melts at about 240–243° C. Mild fusion of this product with alcoholic potash gives a violet solution of Bzl-benzanthrone-potassium selenolate.

If, instead of handling in the air, the above filtrate is saturated with sodium chloride, a violet-colored solid is precipitated. This may be filtered off, washed with saturated sodium chloride solution and acidified. There is thus obtained a bright, reddish-yellow solid which corresponds in selenium content to Bzl-benzanthrone selenol.

The selenol is soluble in dilute sodium sulfide solutions with a bluish-violet color, but is practically insoluble in dilute alkalies. In concentrated sulfuric acid it dissolves with a reddish blue color having a strong red-violet fluorescence. Prolonged aeration of its aqueous solutions, or treatment with oxidizing agents such as nitrobenzene-sulfonic acid or potassium ferricyanide, converts the selenol into the diselenide previously described.

*Example 4*

To a solution of 39 parts of potassium hydroxide in 85 parts of water, 10 parts of selenium powder are added. 3.6 parts of grained aluminum are then gradually added at 85–100° C. over a period of one hour. Air is excluded from the reaction as completely as possible. The selenium goes into solution and the latter becomes brownish orange.

After cooling the solution to 70° C., 105 parts of denatured alcohol and 39 parts of Bzl-bromo-benzanthrone are added and the mixture quickly heated to reflux. After about 1½ hours at this temperature, the mixture is diluted with an equal volume of hot water and quickly filtered from the residue, which contains a small amount of unchanged Bzl-bromo-benzanthrone and some Bzl,Bzl'-dibenzanthronyl selenide.

The filtrate may be used directly for subsequent reactions requiring Bzl-benzanthrone-selenol or the compound may be isolated in solid form by salting out, filtration and acidification. If desired, the violet solution of Bzl-benzanthrone-selenol may be oxidized, for example, by aeration, and the Bzl,Bzl'-dibenzanthrone-diselenide thus obtained may be freed of a small quantity of selenium by extraction with hot neutral sodium sulfite solution.

It will be understood that many variations and modifications may be effected in the preferred mode of operation above set forth, without departing from the spirit of this invention.

I claim:

1. The process of producing a benzanthrone-selenium compound which comprises reacting a Bzl-halogen-benzanthrone with a selenizing agent selected from the group consisting of alkali-metal selenides and alkali-metal polyselenides.

2. The process of preparing a compound of the group consisting of benzanthrone-selenols, alkali-metal salts thereof, dibenzanthronyl-selenides and dibenzanthronyl-diselenides, which comprises reacting upon a Bzl-halogen-benzanthrone with a compound selected from the group consisting of alkali-metal selenides and alkali-metal polyselenides in a low-boiling liquid medium.

3. The process of preparing a compound of the general formula:

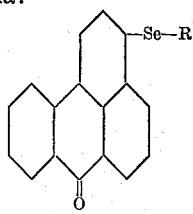

wherein R stands for hydrogen, an alkali-metal, a benzanthrone nucleus or a seleno-benzanthrone radical which comprises reacting with a compound of the alkali-metal selenide series upon a Bzl-halogen-benzanthrone in a medium selected from the group consisting of water, alcohol or mixtures thereof.

4. The process of manufacturing a benzanthrone-selenium compound which comprises forming an alkali-metal selenide in a diluent selected from the group consisting of water, alcohol and mixtures thereof, adding a Bzl-halogen-benzanthrone compound, and heating the mixture to reflux.

5. The process of manufacturing a benzanthrone-selenium compound which comprises continually forming an alkali-metal selenide in a diluent selected from the group consisting of water, alcohol and mixtures thereof and continually reacting the alkali-metal selenide thus formed with a Bzl-halogen-benzanthrone.

6. The process of producing Bzl,Bzl'-dibenzanthronyl-selenide which comprises heating a Bzl-halogen-benzanthrone in a solution or suspension of an alkali-metal selenide in a low boiling diluent at the reflux temperature of the mixture, and continuing the heating until substantial formation of the desired compound.

7. The process of producing Bzl,Bzl'-dibenzanthronyl selenide which comprises heating a Bzl-halogen-benzanthrone in aqueous alcohol containing a mixture of an alkali-metal selenide and polyselenide, at the reflux temperature of the entire mass, and continuing the heating until a test sample of the solid portion of the reaction mass dissolves in concentrated sulfuric acid with a greenish blue coloration.

8. The process of producing Bzl,Bzl'-dibenzanthronyl selenide which comprises heating a Bzl-halogen-benzanthrone in a medium selected from the group consisting of water, alcohol and mixtures thereof, said medium containing further a selenizing agent of the group consisting of alkali-metal selenides and polyselenides, in excess of the quantity required for the theoretical amount of selenium.

9. The process of producing Bzl,Bzl'-dibenzanthronyl-selenide which comprises heating a Bzl-halogen-benzanthrone with an excess of alkali-metal polyselenide in an aqueous medium.

10. The process of producing Bzl, Bzl'-dibenzanthronyl-selenide which comprises heating a Bzl-halogen-benzanthrone with an excess of alkali-metal polyselenide in an aqueous alcoholic medium, and continuing the heating until a test sample of the solid portion of the reaction mass dissolves in concentrated sulfuric acid with a greenish-blue coloration.

11. The process of producing a Bzl-benzanthrone selenolate which comprises heating a Bzl-halogen-benzanthrone in an aqueous alcoholic medium in the presence of an alkali-metal selenide, filtering the reaction mass, and recovering the selenolate from the filtrate.

12. The process of producing Bzl,Bzl'-dibenzanthronyl-diselenide, which comprises first reacting a Bzl-halogen-benzanthrone with an alkali-metal selenide in an aqueous alcoholic medium to produce the corresponding alkali-metal selenolate of benzanthrone, and then oxidizing the latter to produce the diselenide.

13. The process of producing Bzl,Bzl'-dibenzanthronyl-diselenide, which comprises oxidizing a Bzl-benzanthrone-selenolate.

14. The process of producing Bzl,Bzl'-dibenzanthronyl-diselenide, which comprises aerating a solution of a Bzl-benzanthrone-selenolate.

15. A Bzl,Bzl'-dibenzanthronyl-diselenide.

16. Bzl,Bzl'-dibenzanthronyl-diselenide.

MELVIN A. PERKINS.